United States Patent
Schmidt et al.

(10) Patent No.: US 6,442,396 B1
(45) Date of Patent: Aug. 27, 2002

(54) METHOD OF PROCESSING GROUP CALLS WITHIN A WIRELESS COMMUNICATIONS NETWORK

(75) Inventors: Paul E. Schmidt, Forest; Thomas A. Przelomiec, Lynchburg, both of VA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/438,226

(22) Filed: Nov. 12, 1999

(51) Int. Cl.[7] ................................................. H04Q 7/38
(52) U.S. Cl. ....................... 455/518; 455/414; 455/416; 455/519
(58) Field of Search ................................ 455/519, 518, 455/414, 517, 416; 379/167.01, 211.01; 179/18

(56) References Cited

U.S. PATENT DOCUMENTS

| | | | |
|---|---|---|---|
| 3,826,874 A | * 7/1974 | Fleming | ...................... 179/18 |
| 5,631,904 A | 5/1997 | Fitser et al. | |
| 5,699,407 A | * 12/1997 | Nguyen | |
| 5,987,318 A | * 11/1999 | Alperovich | .................. 455/416 |
| 6,115,613 A | * 9/2000 | Jonsson | ........................ 455/519 |
| 6,134,450 A | * 10/2000 | Nordeman | .................. 455/517 |
| 6,363,258 B1 | * 3/2002 | Schmidt et al. | ............. 455/414 |

FOREIGN PATENT DOCUMENTS

| | | | | |
|---|---|---|---|---|
| EP | 0954156 | * | 3/1999 | ............ H04M/3/56 |
| EP | 0954156 A2 | | 11/1999 | |

* cited by examiner

*Primary Examiner*—Dwayne Bost
*Assistant Examiner*—Tanmay S Lele
(74) *Attorney, Agent, or Firm*—Coats & Bennett, P.L.L.C.

(57) ABSTRACT

The invention includes a method for processing group calls. A group list is created having a plurality of group members and preferably includes for each group member whether the group member requires an affirmative response when contacted, and an identifier. A request is received from an originator to contact the group members. At least one of the group members is contacted, and an affirmative response is requested. After receiving the affirmative response, the originator and group member are connected. If no affirmative response is received, the group member is not connected with the originator.

15 Claims, 4 Drawing Sheets

METHOD OF PROCESSING GROUP CALLS WITHIN A WIRELESS COMMUNICATIONS NETWORK

BACKGROUND OF THE INVENTION

The present invention relates generally to a wireless communications network and, more particularly, to a method of processing group calls.

Group calls are special types of calls where the call originator is trying to communicate with one or more members of a predefined member group. Instead of individually dialing each group member, the originator may dial a single number that corresponds to the group and the network contacts the group members. This saves time and is much more convenient for the originator to dial a single number than to individually dial each group member, thereby saving the time and enhancing user satisfaction.

Each user may define any number of separates groups. Additionally, each group may include any number of separate users that are to be contacted. By way of example, a user may have a first group of persons who are working on a specific project with them at work. The same user may have a second group for persons on their bowling team. Preferably, each group is identified by a unique identifier and a password.

Each call to a group may be established as either a broadcast call type or a talk call type. Within a broadcast call type, only the call originator may speak and all recipients can only listen. Within a talk call type, each of the connected members may speak and listen. Talk types may be further divided into sequential, simultaneous/first answer, and conference call subtypes. A sequential subtype is one in which a call will be placed to a first group member, and if they do not answer, the next group member will be called. This sequence continues until a group member is contacted or the group is exhausted. A simultaneous/first answer subtype call provides for calls to be generated to all members within the group and only connecting to the first member that answers. A conference call subtype generates a call to be generated to all group members and the voice paths of those that answer are summed together.

Previous systems have experienced problems with sequential and simultaneous/first answer call subtypes when the originator contacts a user who is not at the phone or terminating device and voice mail or other like answering service answers the call. Because of limitations in the Signaling System 7 (SS7) and IS-41 protocols, there is currently no manner to differentiate between a voice mail service and a group member answering the call. A call placed to a group member that is answered by an answering service stops the sequential or simultaneous call subtype process without actually contacting a group member. Likewise, within the conference call subtype with the voice paths of all group members summed together, all members will hear the voice mail recording which may also prove frustrating and disruptive.

SUMMARY OF THE INVENTION

The present invention provides a method of conveniently contacting members of a group. After the members are called, they are requested for an affirmative response to ensure the call is received by a group member, and not an answering machine or service. Each group member may be required to enter the same affirmative response when prompted, or each group member may have their own affirmative response. If the group member does not respond, they are not connected with the call originator. When the group member does respond with an affirmative response, they are connected with the call originator.

Information regarding each of the group members is stored within a database. An originator of the group call requests that the group members be contacted, and at least one of the group members is reached through the corresponding information stored in the database. The group member is requested for an affirmative response, and if it is input, the group member is connected. If no affirmative response is input, the group member is not connected.

The group calls may be either a broadcast call type wherein only the originator may generate source message signals, and a talk call type wherein source message generation occurs between both the originator and the group members. Within the talk call type, the originator may further choose between simultaneous/first action, sequential, and a conference call subtypes.

The simultaneous/first action subtype allows for each of the group members to be called, and the first group member to answer being requested for the affirmative response. If input by the first group member, the member is connected to the originator and the calls to the other group members are stopped. If the first group member does not respond with the affirmative response, a second group member is prompted.

The sequential subtype provides for contacting a first group member and requesting the affirmative response. If the response is received, the first group member is connected with the originator and the process ends. If the first group member does not respond, they are stopped and a second group member is contacted.

The conference call provides for contacting each group member and requesting the affirmative response. Those members responding are connected to the originator. Members not responding with the affirmative response are kept out of the call.

DETAILED DESCRIPTION OF THE INVENTION

Figure 1:
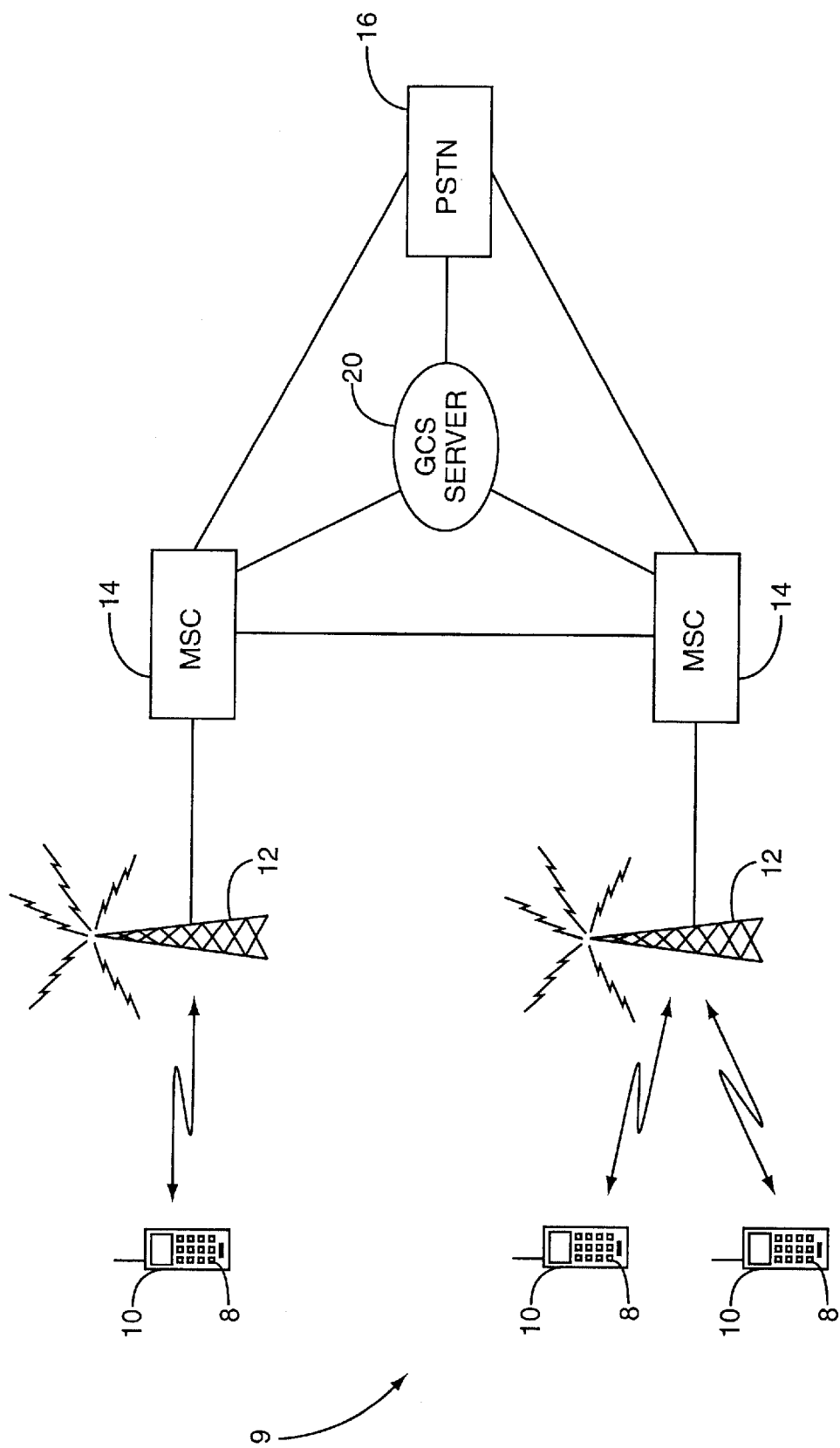
FIG. 1 is a schematic illustration of a wireless communication network with group call services server.

Referring now to the drawings, a wireless communications network, which is indicated generally by the numeral 9 in FIG. 1, typically includes a plurality of base stations 12 which are connected via a mobile switching center (MSC) 14 to a terrestrial communications network such as the Public Switched Telephone Network (PSTN) 16. A group call services server (GCS) 20 is connected to the MSC's 14 and PSTN 16 within the network 9 for managing the call setup activities for group calling features. Alternatively, the GCS 20 may not directly connect to the PSTN 16, but rather communicate with the MSC's 14 which then connect to the PSTN. When the wireless communications network 9 receives a group call request, the request is forwarded to the GCS 20. The other components of the network 9 cooperate with the GCS 20 to facilitate the group call.

Each base station 12 is located in, and provides service to, a geographic region referred to as a cell. In general, there is one base station 12 for each cell within a given network. Within each cell, there may be a plurality of wireless communications devices 10, such as a mobile terminal, that communicate via radio link with the base station 12. The base station 12 allows the user of the mobile terminal 10 to communicate with other wireless communications devices 10, or with users connected to the PSTN 16. The MSC 14 routes calls to and from the wireless communications devices 10 through the appropriate base station 12. The mobile terminal 10 illustrated is a digital cellular telephone, but the invention is not so limited and may encompass a wide variety of devices including dual-mode phones capable of phone mode operation and radio mode operation, cellular phones, and others.

A number of mobile communications networks may be positioned throughout a geographic region. Each network contains their own base stations and mobile switching centers providing for intra-network communication, and a connection to the PSTN 16. The various networks throughout a region preferably also provide for inter-network communication. Thereby, a user subscribing to communication service through a first network may contact another user subscribing through a separate network and being physically located within that separate network. The networks are linked together and provide for determining where each user is physically located and routing calls through the appropriate networks for accessing the users. In this illustration, the mobile communications device 10 is a cellular telephone operating in accordance with ANSI-41/ANSI-136.

Wireless communications devices 10 allow users to receive and transmit signals to the network 9. The devices 10 also include a means for inputting an affirmative response for indicating to the network that a signal has been received. In one embodiment, the device 10 includes a keypad 8 that allows the operator to dial numbers, enter commands, and select options, and a display that allows the operator to see dialed digits, stored information, and call status information. Preferably, the device also includes audio processing circuits providing basic analog audio outputs to a speaker allowing the user to hear transmitted signals and also send audio signals to the network 9. Affirmative actions by the group member may include pushing a key on the keypad 8, talking into the speaker, and other like methods.

The GCS 20 includes a database of user groups, where each group member's call address (e.g., phone number) is listed, as well as the required affirmative response when the group member is contacted. When the group members are contacted through the GCS 20, the affirmative response registers that the group member is present for the communication as opposed to an answering service. Each member of a group may have the same affirmative response requirement, or each member may be separately established. By way of example, a single group may require that each member hit a key on the keypad 8 when prompted to be connected with the group call. Alternatively, each member may be different such as a first member inputting a key, a second member speaking into the device, etc. The requirement for each member is determined when the group member information is entered into the database to be accessed by the GCS 20 during the group call generation. Additionally, some group members may not require an affirmative response to be connected with the originator. Once the GCS 20 contacts these members, they are automatically connected.

Each group list preferably includes a password that is required prior to a call generation by the GCS 20. Therefore, the originator must input a unique user group identifier and optionally a password prior to generating a group call. By way of example, a user group may include each employee within a company. The president of the company can send out a broadcast call type message to the group by inputting the unique user group identifier and corresponding password.

Each list may further contain group members from different networks and also landline phones. Therefore, a single group may be established that contains cellular phone group members from various networks and landline group members. This is advantageous in many applications such as a nationwide company that has employees distributed throughout the country and serviced by a variety of separate networks and phone systems.

The GCS 20 provides for establishing two categories of groups: pilot number groups and private number groups. Pilot number groups are publicly defined in that any user calling that number will reach the same user group, assuming the user is authorized to access the group with the group identifier and optional password. In the United States, Canada, and Mexico, the pilot number preferably uses a standard ten digit North American Numbering Plan number, although other numbers and combinations may also be assigned each group. Upon receiving a pilot number group request, the GCS 20 compares the number to the list of groups stored in the memory of pilot numbers to determine the group members for the group call. By way of example, a first user dialing a ten digit pilot number will access the same group as a second user dialing the same ten digit pilot number. Preferably, any user may originate a pilot number group call provided they know the group list identifier, and/or the proper password associated with the pilot number.

A second category of calls provides for private number groups that are individually established by each user. Each user may have any number of separate user groups, each containing any number of group members. Upon the originator inputting the request, the MSC 14 routes the call request to the GCS 20 which determines the group based upon the dialed digits and the user who originated the call. Preferably, the private number groups use a shortened dialing method than the pilot number groups, such as "*12". By way of example, when user A dials *12, the GCS 20 generates a call to a different group of individuals than if User B were to dial *12. Preferably, the network 9 supports call line ID providing for the group members caller ID window to display the phone number of the call originator.

Figure 2:
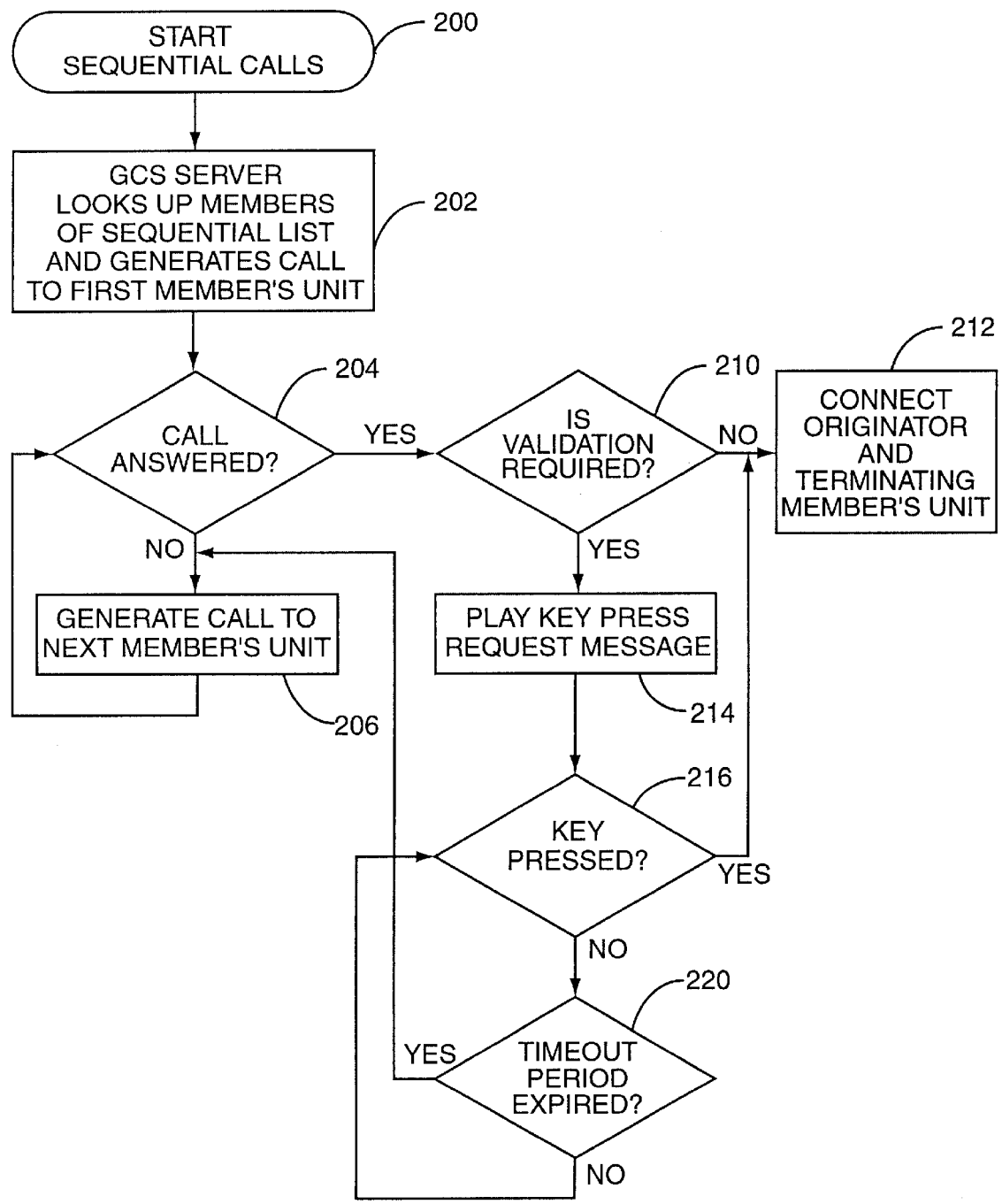
FIG. 2 is a flowchart illustrating the process of establishing a sequential group call.

FIG. 2 illustrates the logical flow of the GCS 20 for a talk type call with sequential call subtype. An originator dials the appropriate group identifier, either pilot number group or private number group, and enters any necessary password to establish the call (block 200). The call is transferred from the MSC 14 to the GCS 20 which looks up the members of the group and initiates a call to the first member's unit (block 202). If the call is not answered (block 204), the GCS 20 will determine the next group member and attempt a call (block 206). If the call is answered, the GCS 20 determines whether validation is required (block 210). If validation is not required, the originator and terminating member are connected and the process ends (block 212). If validation is required, the GCS 20 plays a request for the group member to press a key or provide some other positive affirmative response (block 214). If the affirmative response is performed such as pressing a key (block 216), the originator and terminating member are connected. If the key is not pressed (block 216), the GCS 20 waits for a predetermined timeout period (block 220). If no key is pressed during the timeout period, the GCS 20 attempts to contact the next group member. During the timeout period, the GCS 20 may repeat the request for affirmative response.

Figure 3:
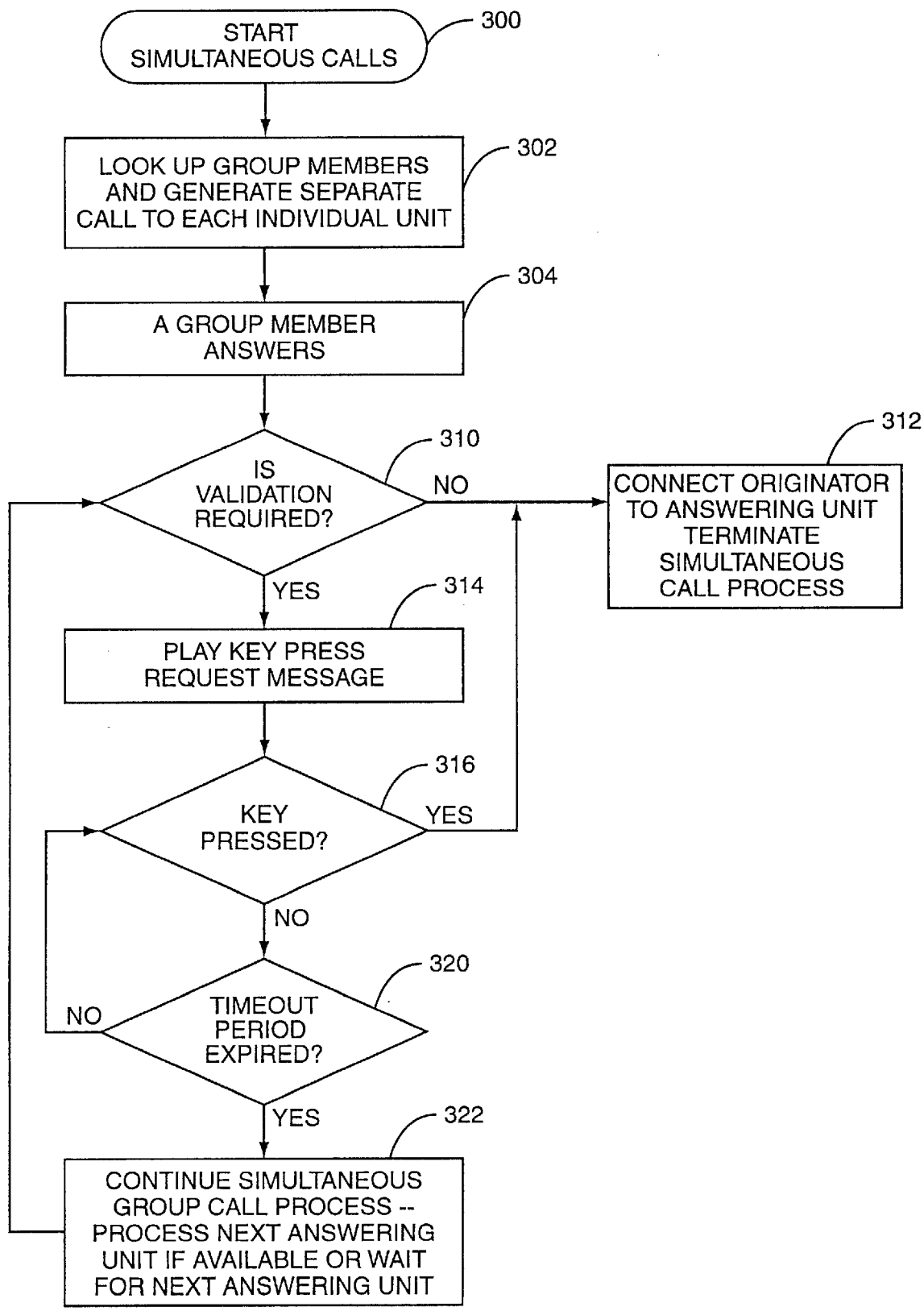
FIG. 3 is a flowchart illustrating the process of establishing a simultaneous group call.

FIG. 3 illustrates the process for starting a talk type with simultaneous/first answer call subtype (block 300). Once the originator places a request with the group identifier and any necessary password, the GCS 20 looks up the group in the database and generate separate calls to each individual group member (block 302). Once a group member answers, the GCS 20 identifies the member (block 304) and determines whether affirmative response validation is required for that member (block 310). If no affirmative response validation is required (block 310), the originator and answering unit are connected and the process ends (block 312). If affirmative response validation is required (block 310), the GCS 20 plays a request for an affirmative response such as pressing a key or other validation step (block 314). If a key is pressed or other requested affirmative response validation is given (block 316), the originator and answering unit are connected and the process ends (block 312). If no affirmative response such as pressing a key results (block 316), the GCS 20 waits for a predetermined timeout period (block 320). If the timeout period expires without an affirmative response from the answering unit, the simultaneous/first answer group call process continues and the next answering unit will be processed (block 322).

Figure 4:
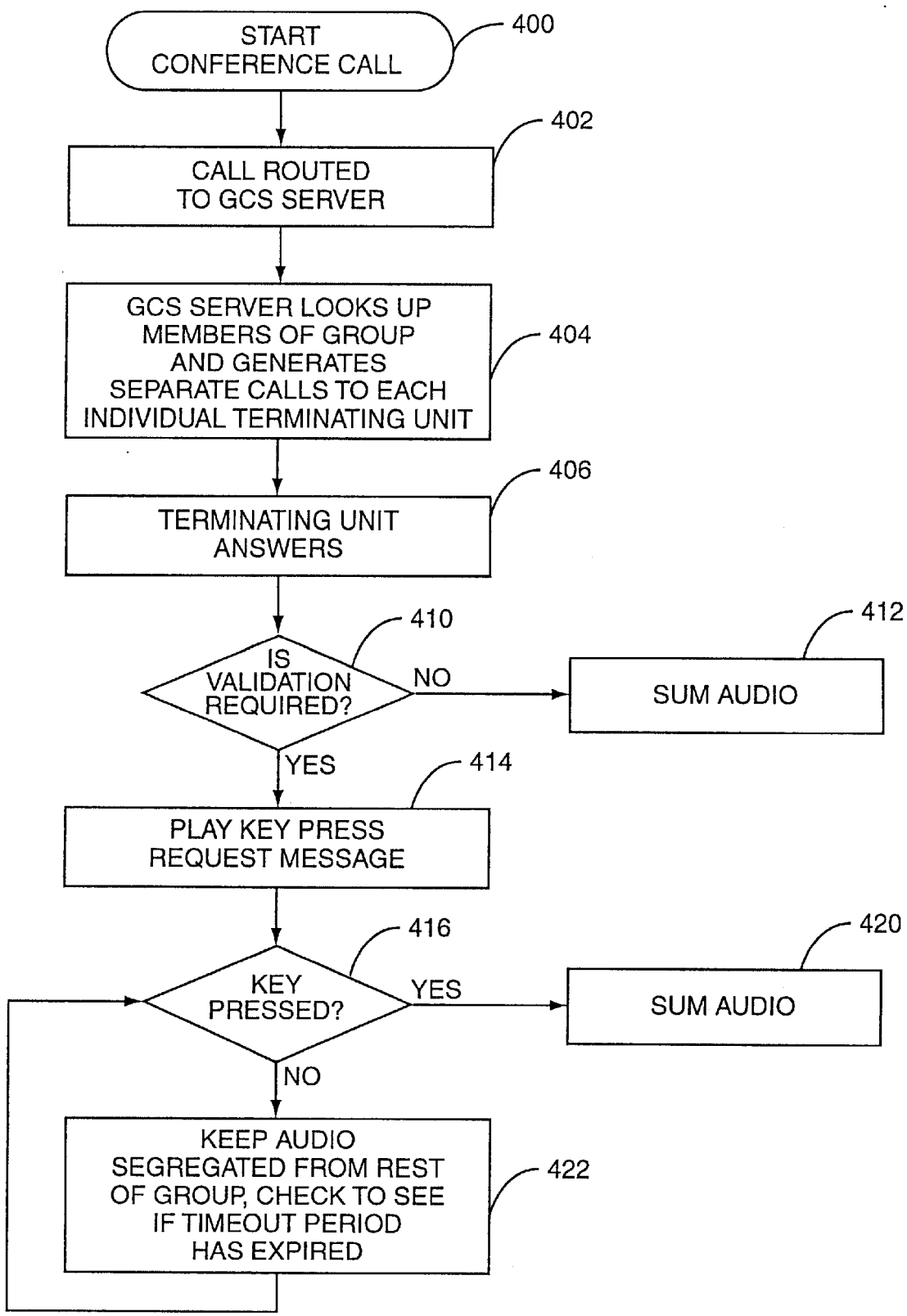
FIG. 4 is a flowchart illustrating the process of establishing a conference call in accordance with the present invention.

The talk type conference call subtype logic is illustrated in FIG. 4. The originator dials a group identifier and any necessary password to start a conference call (block 400) which is then routed to the GCS 20 (block 402). The GCS 20 looks up the address of the group members and generates separate calls to each of the members (block 404). When a terminating unit answers (block 406), the GCS 20 determines whether affirmative response validation is required (block 410). If no affirmative response validation is required, the audio is summed together, such as into a single conference line (block 412). If affirmative response validation is required, the GCS 20 plays a request indicating that an affirmative response is necessary by the group member (block 414). If a key is pressed or other required affirmative response given (block 416), the audio is summed together (block 420). Until affirmative response is taken, the GCS 20 keeps the audio segregated from the summed audio for a predetermined timeout period (block 422). If no affirmative response is taken and the timeout period expires, the group member is kept out of the conference call and the process terminates. It is understood that these steps will be taken for each member within the selected group.

The present invention may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of contacting a group of members comprising:
   establishing a database of user groups each having one or more group members, each of the user groups having an address for each group member and an affirmative response;
   receiving a request from an originator to initiate a simultaneous/first action call to one of the user groups and, in response thereto, dialing each of the group members;
   prompting a first group member that answers the call for the affirmative response; and
   receiving the affirmative response from the first group member, and thereafter, connecting the first group member to the originator.

2. The method of claim 1, wherein each of the user groups is identified by a group identifier.

3. The method of claim 1, further including stopping the calls to the remaining group members after the affirmative response is received from the first group member.

4. The method of claim 1, further including stopping the call to the first group member if the affirmative response is not received and prompting a second group member for the affirmative response.

5. The method of claim 1, wherein at least one of the group members does not require performing the affirmative response and is automatically connected with the originator.

6. The method of claim 1, further including storing the database at a server within a wireless communications network.

7. The method of claim 6, further including receiving the request from the originator at a mobile switching center and transferring the request to the server.

8. A method of contacting a group of members comprising:
   establishing a database of user groups each having one or more group members, each of the user groups having an address for each group member and an affirmative response;
   receiving a request from an originator to initiate a sequential call to one of the user groups and, in response thereto, dialing a first group member through the corresponding address;
   contacting the first group member and requesting the affirmative response;
   if an affirmative response is received from the first group member, connecting the first group member with the originator; and
   if an affirmative response is not received from the first group member, contacting a second group member and requesting the corresponding affirmative response.

9. The method of claim 8, wherein the group is either a pilot number group or a private number group.

10. The method of claim 8, wherein the affirmative response is the group member pressing a key on a receiving device.

11. The method of claim 8, further including providing the first group member with a predetermined period to respond with the affirmative response prior to attempting to contact the second group member.

12. A method of servicing a conference call comprising the steps of:
    storing a group list having a plurality of group members, the list includes for each group member an affirmative response and an identifier;
    receiving a call request from an originator to contact the group members;
    generating a call to each of the group members;
    after waiting a predetermined time for the group member to answer, stopping the call attempt to the group member;
    receiving an answer from at least one of the group members;
    requesting the affirmative response from at least one of the answering group members; and
    summing the audio of the group members that provide the affirmative response.

13. The method of claim 12, further including storing the database at a server within a wireless communications network.

14. The method of claim 12, further including segregating the audio for each of the answering group members that does not provide an affirmative response.

15. The method of claim 13, further including receiving the request from the originator at a mobile switching center and transferring the request to the server.

* * * * *